Patented Apr. 12, 1932

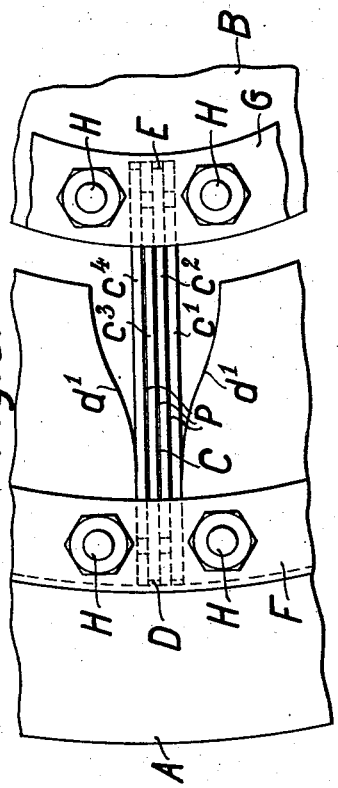
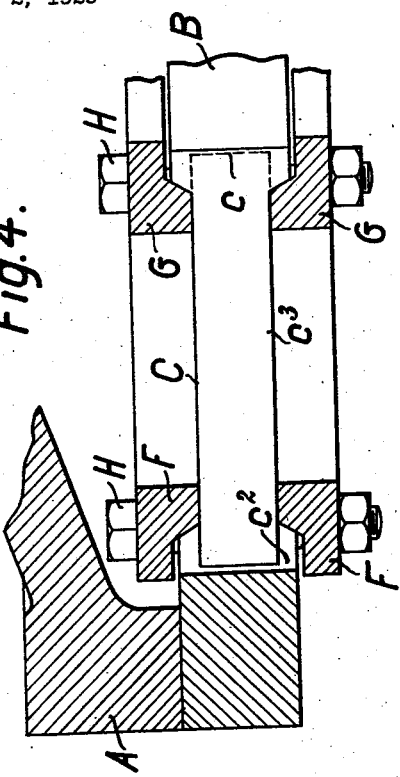
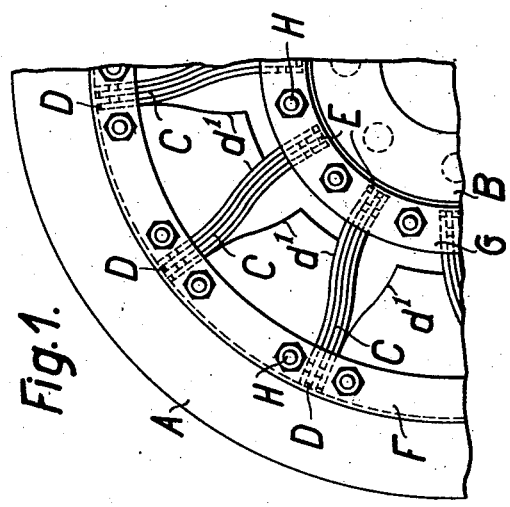
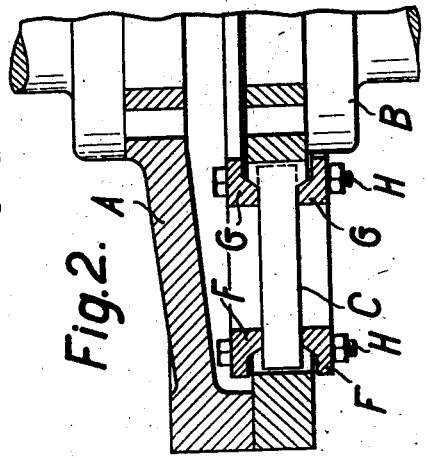

1,853,757

UNITED STATES PATENT OFFICE

HEINZ BEHRENS, OF KIEL, GERMANY, ASSIGNOR TO FRIED KRUPP GERMANIAWERFT AKTIENGESELLSCHAFT, OF KIEL-GAARDEN, GERMANY

ELASTIC SHAFT COUPLING

Application filed July 2, 1929, Serial No. 375,485, and in Germany July 10, 1928.

The invention relates to elastic shaft couplings intended to damp vibrations and in which piles of springs are mounted as elastic coupling members in grooves arranged oppositely to one another in the coupling halves. The invention consists in the fact that the individual plates of these piles alternatively are fixed on the one and the other coupling half so that fast and loose spring plates follow one another in each groove which plates are shifted longitudinally relatively to one another upon the piles bending.

In order that the invention can be more easily understood, a preferred embodiment of the same is illustrated by way of example in the accompanying drawings in which Figure 1 is a fragmentary front elevation of the coupling, Figure 2 is a corresponding cross section, Figure 3 shows on an enlarged scale one of the spring piles with the coupling halves, which latter assume another position, and Figure 4 is a corresponding cross section.

Referring to these drawings, A is the one and B the other coupling half. C denote the spring piles which rest with their ends in grooves D and E, respectively, of the coupling halves A and B. The grooves D diverge by limits defined by the curved faces $d^1$, which adjacent the grooves, are curved outwardly, and which serve as abutments for the spring piles C. The spring plates are protected from escaping from the grooves by lateral rings F and G which are fixed on the coupling halves A and B, respectively, by screws H and cover the grooves on opposite sides of the spring members. The plates denoted by $c^1$, $c^3$, see Figure 3, of the individual plates of the piles C are rigid only on coupling half B, while the plates denoted by $c^2$, $c^4$ are rigid only on coupling half A. To this end the individual plates are enlarged at their ends to be fixed so as to form feet, see Figures 2 and 4, that are held in place by the rings F and G, the latter to this end having corresponding annular recesses.

When vibrations arise between the parts of the shaft connected by the described coupling, bending of the spring piles C is caused. Owing to the described alternate fixation of the individual plates the groups of plates $c^1$, $c^3$ in bending shift relatively to the groups $c^2$, $c^4$, the energy of the vibrations thereby being converted to friction. When violent shocks occur, a bending of the springs to such an extent can occur, that e. g. the outer plate $c^4$ comes into contact with the neighboring face $d^1$, as illustrated in Figure 1. When this takes place, the effective length of the spring is reduced which fact is desirable for reasons of strength.

To avoid too great wear of the spring plates, thin sheet metal plates $p$ of softer material, e. g. brass may be inserted between them which plates easily can be exchanged after having worn out.

What I claim is:

1. An elastic shaft coupling comprising two coupling halves, grooves in said coupling halves, piles of spring plates engaging said grooves, the individual plates of said piles being fastened alternately on said two coupling halves.

2. An elastic shaft coupling comprising two coupling halves, grooves in said coupling halves, piles of spring plates engaging said grooves, the individual plates of said piles being fastened alternately on said two coupling halves the grooves of at least one of said coupling halves diverging into outwardly curved surfaces.

3. An elastic shaft coupling comprising two coupling halves, grooves in said coupling halves, piles of spring plates engaging said grooves, the individual plates of said piles being fastened alternately on said two coupling halves, and plates of a material softer than that of the spring plates inserted between the latter.

The foregoing specification signed at Hamburg, Germany, this 12th day of June, 1929.

HEINZ BEHRENS.